US009659221B2

(12) United States Patent
Renner et al.

(10) Patent No.: US 9,659,221 B2
(45) Date of Patent: May 23, 2017

(54) VIDEO STREAM EVALUATION

(71) Applicant: Martin Vorbach, Lingenfeld (DE)

(72) Inventors: Alexander Renner, Kaiserslautern (DE); Daniel John, Langheckerhof (DE)

(*) Notice: Subject to any disclaimer, the term of this patent is extended or adjusted under 35 U.S.C. 154(b) by 4 days.

(21) Appl. No.: 14/773,852

(22) PCT Filed: Mar. 11, 2014

(86) PCT No.: PCT/EP2014/054675
§ 371 (c)(1),
(2) Date: Sep. 9, 2015

(87) PCT Pub. No.: WO2014/139997
PCT Pub. Date: Sep. 18, 2014

(65) Prior Publication Data
US 2016/0019428 A1 Jan. 21, 2016

(30) Foreign Application Priority Data
Mar. 11, 2013 (DE) .................. 10 2013 004 073

(51) Int. Cl.
G06K 9/00 (2006.01)
G06T 7/00 (2017.01)
(Continued)

(52) U.S. Cl.
CPC ...... *G06K 9/00771* (2013.01); *G06K 9/00711* (2013.01); *G06K 9/00744* (2013.01); *G06T 7/0004* (2013.01); *G06T 7/254* (2017.01); *G06T 7/269* (2017.01); *H04N 7/18* (2013.01); *H04N 17/004* (2013.01); *G06T 2207/30232* (2013.01)

(58) Field of Classification Search
CPC ............ G06K 9/00771; G06K 9/00711; G06T 7/2066; G06T 7/0004; G06T 7/2053; G06T 2207/30232; H04N 17/004; H04N 7/18
See application file for complete search history.

(56) References Cited

U.S. PATENT DOCUMENTS 5,880,775 A * 3/1999 Ross ................. G08B 13/19602
348/143
6,647,131 B1 * 11/2003 Bradski .............. G06K 9/00335
348/700
(Continued)

FOREIGN PATENT DOCUMENTS

JP  2008 118340 A   5/2008
JP  2012 175257 A   9/2012

OTHER PUBLICATIONS

Ling, Cai et al., "Robust Contour Tracking by Combining Region and Boundary Information," IEEE Transactions on Circuits and Systems for Video Technology IEEE Service Center, Piscataway, NJ, US. vol. 21, No. 12, Dec. 2011, pp. 1784-1794.
(Continued)

*Primary Examiner* — Aaron W Carter
(74) *Attorney, Agent, or Firm* — Salter & Michaelson

(57) ABSTRACT

The invention relates to a method for recognizing activities detected in video streams. In this case, it is intended that data relating to frame differences are accumulated for frame sequences in fields, gradients and/or value difference intervals are determined in the accumulator fields, and activity is concluded from the gradients.

19 Claims, 13 Drawing Sheets

Enlarged views of the difference images accumulated in accordance with different strategies of Figure 1g in the contour representation selected for improving printability of the present specification with clearer and thus more easily detectable gradient lines within the movement range

(51) Int. Cl.
  *H04N 7/18* (2006.01)
  *H04N 17/00* (2006.01)
  *G06T 7/254* (2017.01)
  *G06T 7/269* (2017.01)

(56) References Cited

U.S. PATENT DOCUMENTS

| | | | | |
|---|---|---|---|---|
| 2002/0141637 | A1* | 10/2002 | Brodsky | G06K 9/00771 382/165 |
| 2006/0245618 | A1* | 11/2006 | Boregowda | G06T 7/246 382/107 |
| 2007/0250898 | A1* | 10/2007 | Scanlon | G06K 9/00771 725/135 |
| 2014/0176708 | A1* | 6/2014 | Ramakrishnan | G06K 9/00771 348/143 |
| 2016/0019428 | A1* | 1/2016 | Renner | G06K 9/00771 382/195 |

OTHER PUBLICATIONS

Li, Weibin et al., "Robust Detection of Vehicle Queue Based on Image Processing," Computer Measurement & Control Magazine Agency of Computer Measurement & Control China, vol. 19, No. 8, Aug. 2011, pp. 1810-1813.

Mahadeven, Vijay et al., "Spatiotemporal Saliency in Dynamic Scenes," IEEE Transactions on Pattern Analysis and Machine Intelligence, IEEE Computer Society, USA., vol. 32, No. 1, Jan. 2010, pp. 171-177.

Yang, Ming et al., "Detecting Human Actions in Surveillance Videos," TREC video retrivel, 2009, URL:http://www-nlpir.nist.gov/projects/tvpubs/tv9.papers/nec-uiuc.pdf.

Babu, R. Venkatesh et al., "Recognition of Human Actions Using Motion History Information Extracted from the Compressed Video," Image and Vision Computing Elsevier Netherlands, 22, Aug. 2004. pp. 597-607.

* cited by examiner

Figure 1a Test frame from a frame sequence in which a person moves away from the camera
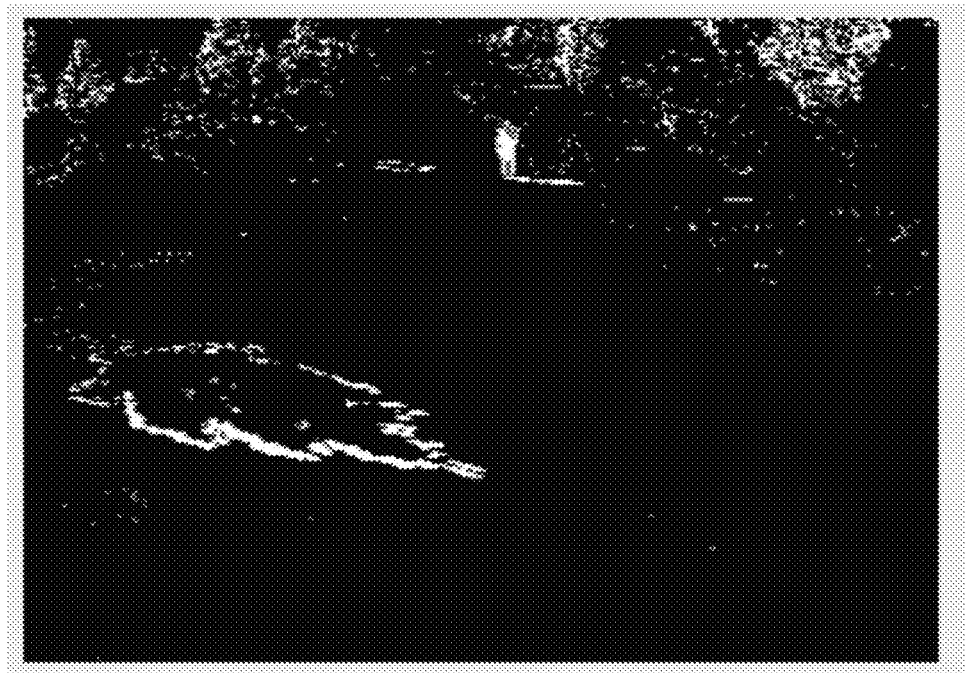
Figure 1b Difference image relating to the frame sequence

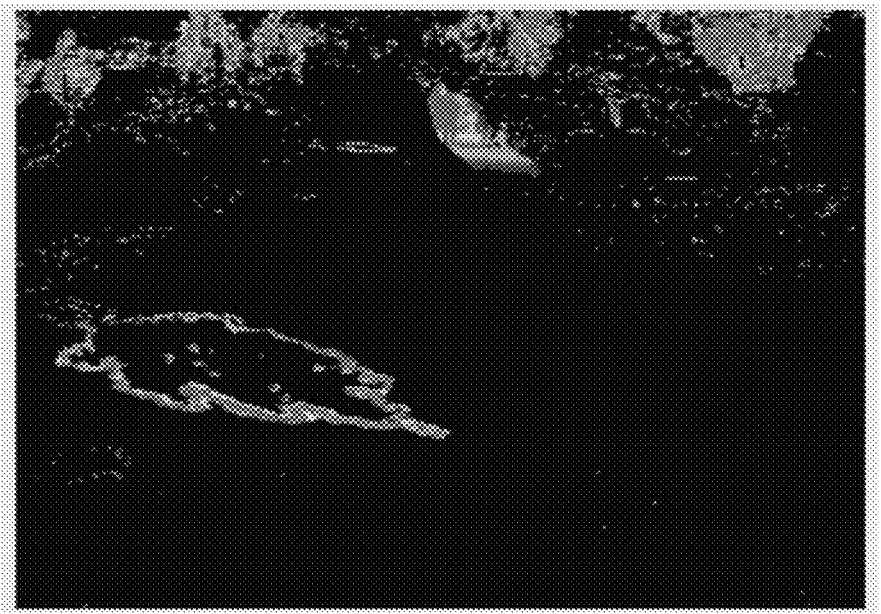
Figure 1c Difference images accumulated in accordance with strategy 1 ("forwards")
Figure 1d Difference images accumulated in accordance with strategy 2 ("rearwards")

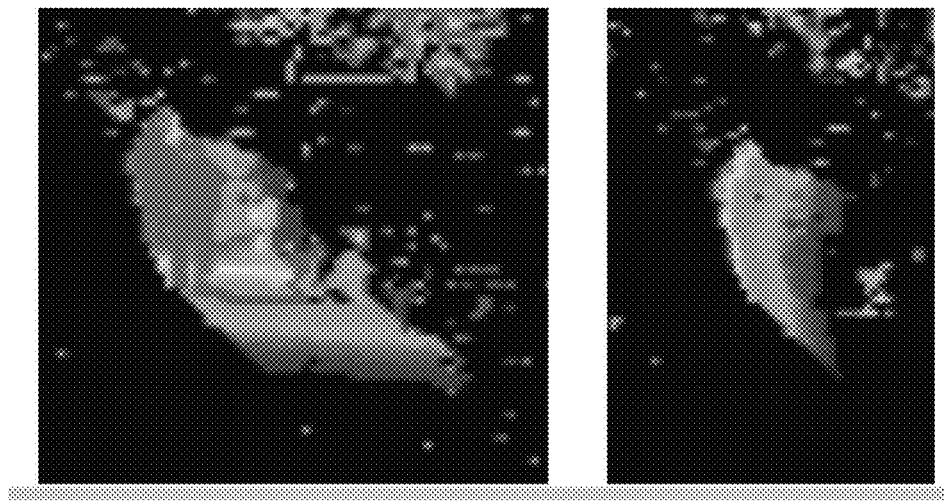
Figure 1e Sections of the difference images forwards/rearwards
Figure 1f Contour images relating to Figure 1a and Figure 1b with gray value lines
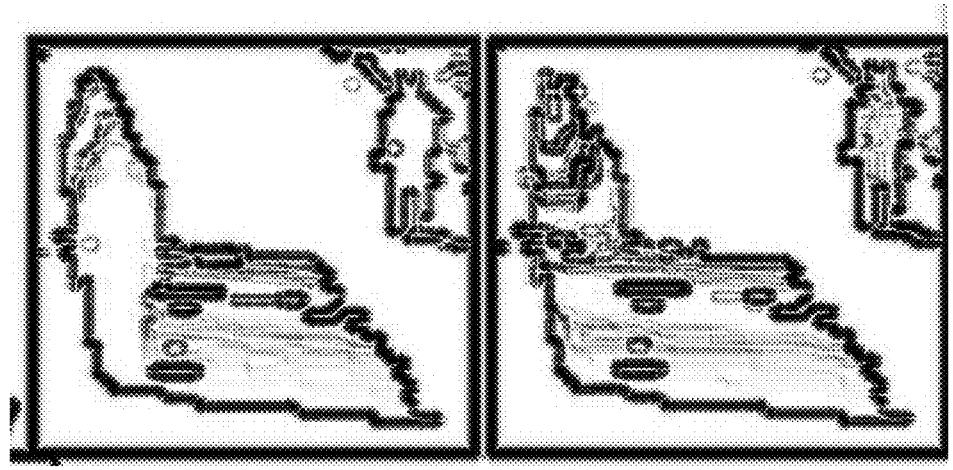
Figure 1g Contour images relating to Figure 1e with gray value lines

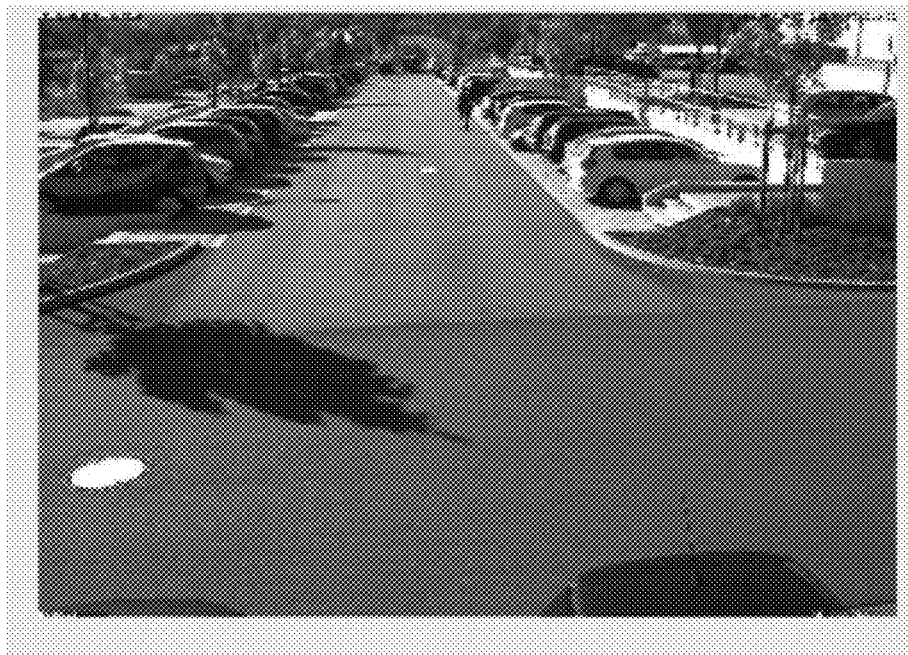
Figure 2a Test frame from a frame sequence in which a person enters the scene from the right, moves to the left and then moves away from the camera along the cars (shown in this phase)
Figure 2b Difference image from the frame sequence of Figure 2a

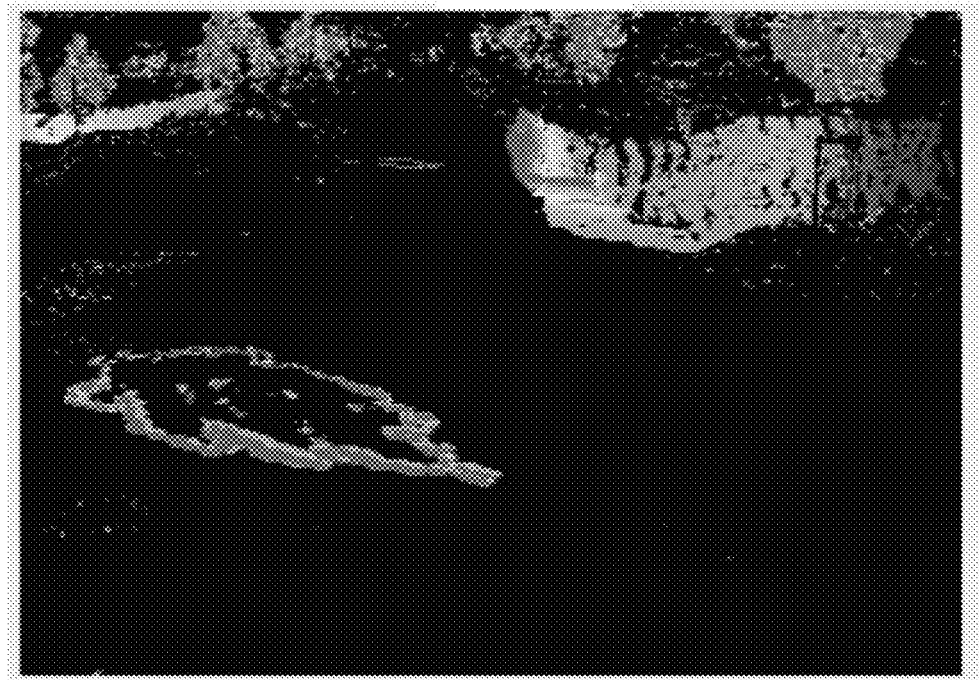
Figure 2c Difference images accumulated in accordance with strategy 1 ("forwards")
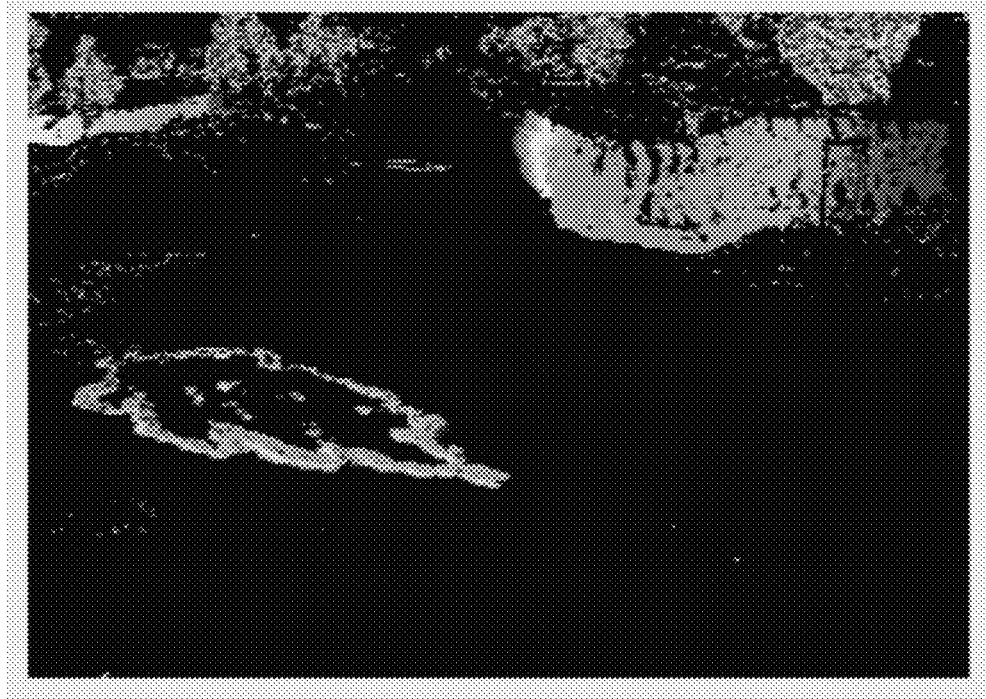
Figure 2d Difference images accumulated in accordance with strategy 2 ("rearwards")

Figure 2e Contour images relating to Figures 2c/2d

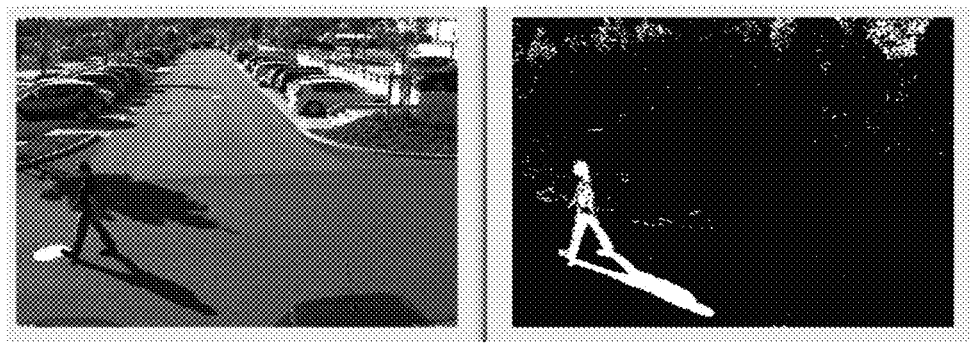
Figure 3a Movement of a person transversely with respect to the camera
on the left an example frame from the test sequence
on the right a difference image relating to the previous frame
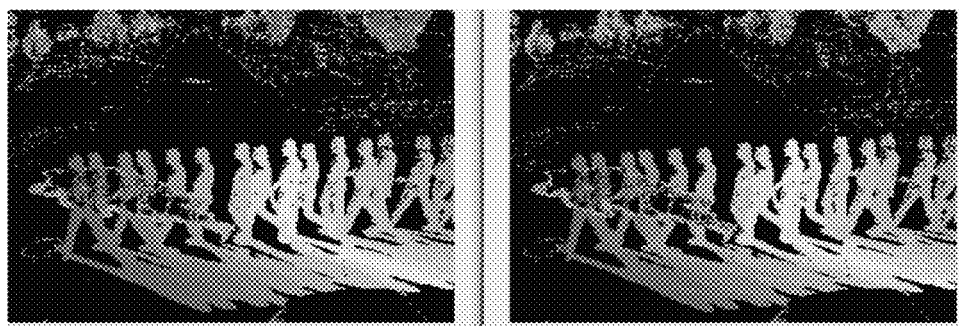
Figure 3b Differences accumulated in accordance with different strategies

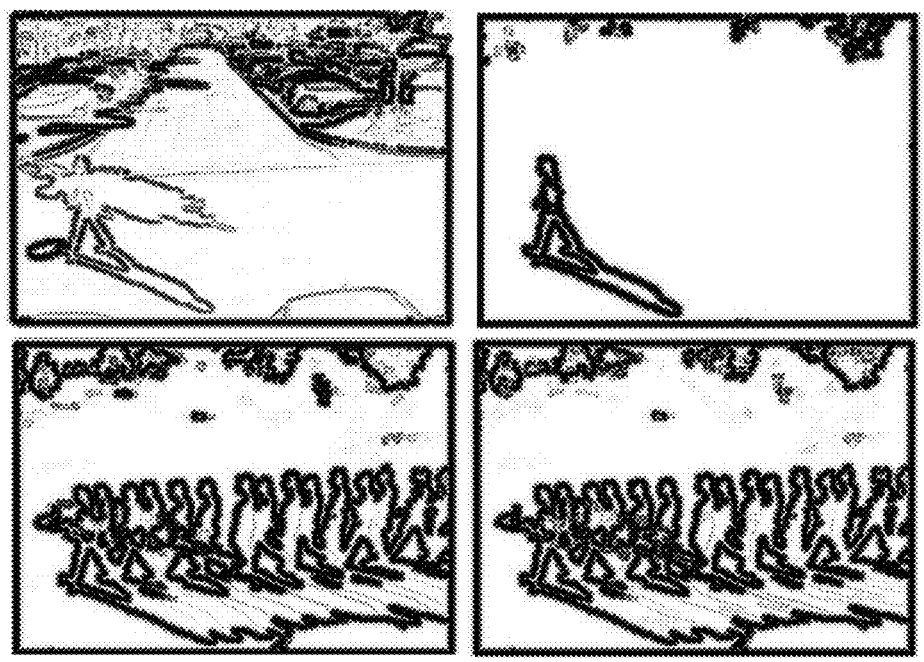
Figure 3c Contour images relating to Figures 3a and 3b, namely
at the top relating to Figure 3a
at the bottom relating to Figure 3b

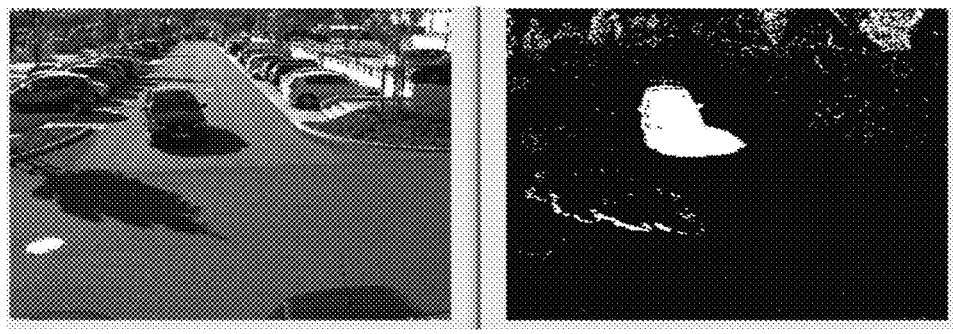
Figure 4a Movement of a car towards the camera
on the left an example frame from the test sequence
on the right a difference image relating to the previous frame
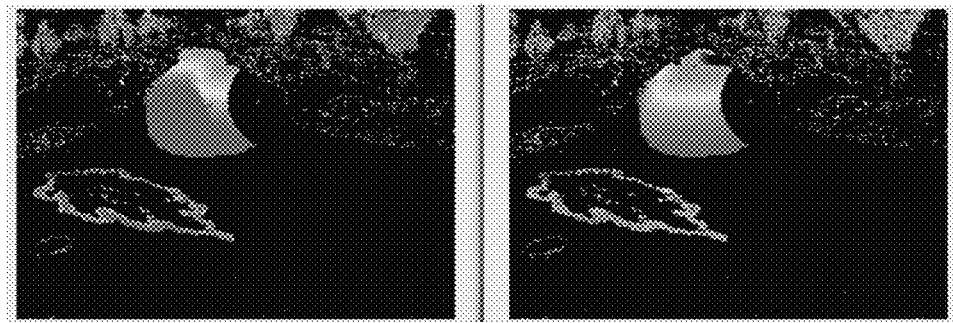
Figure 4b Differences accumulated in accordance with different strategies

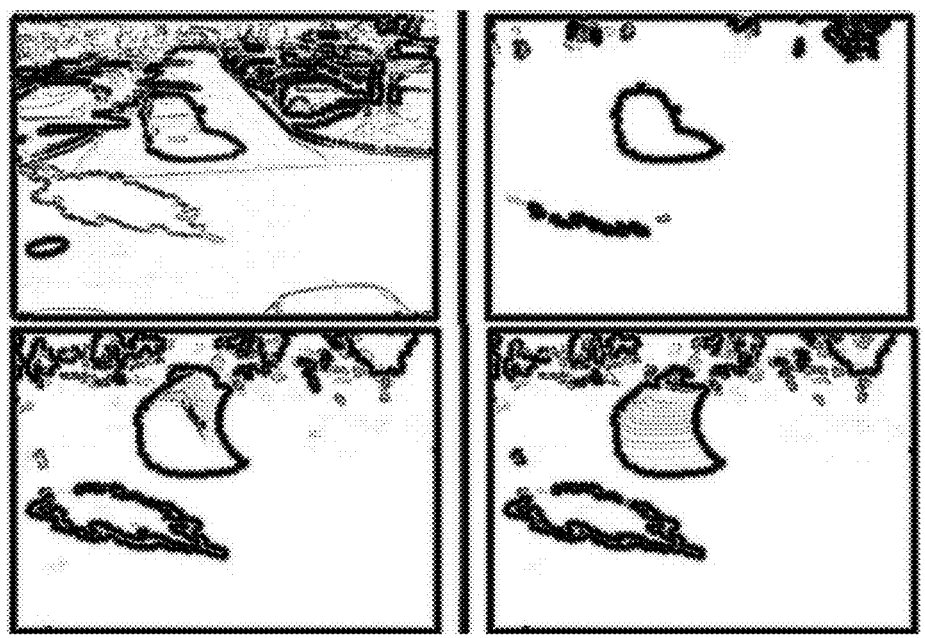
Figure 4c Contour images relating to Figures 4a and 4b, namely
at the top relating to Figure 4a
at the bottom relating to Figure 4b

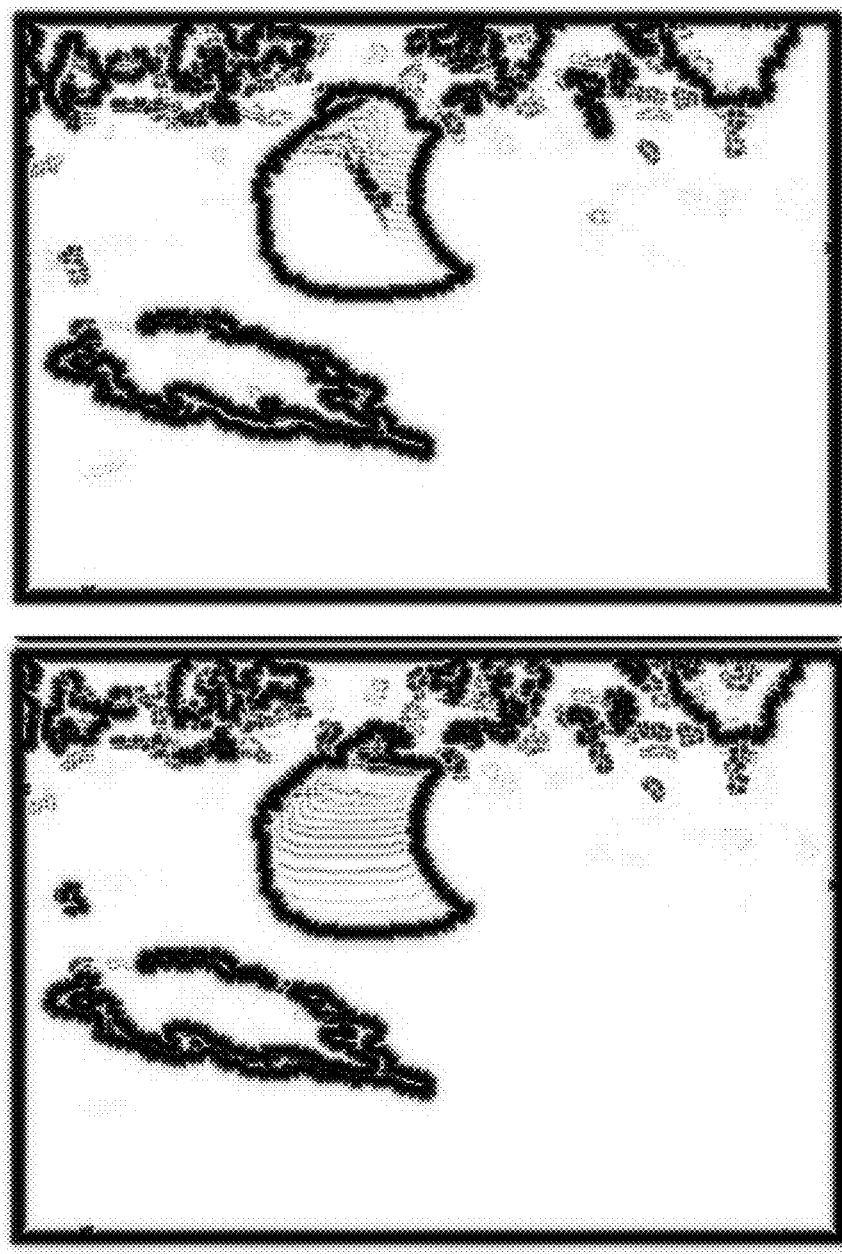
Figure 5 Enlarged views of the difference images of Figure 4b accumulated in accordance with different strategies in the contour representation selected for improving printability of the present specification with clearer and thus more easily detectable gradient lines within the movement range

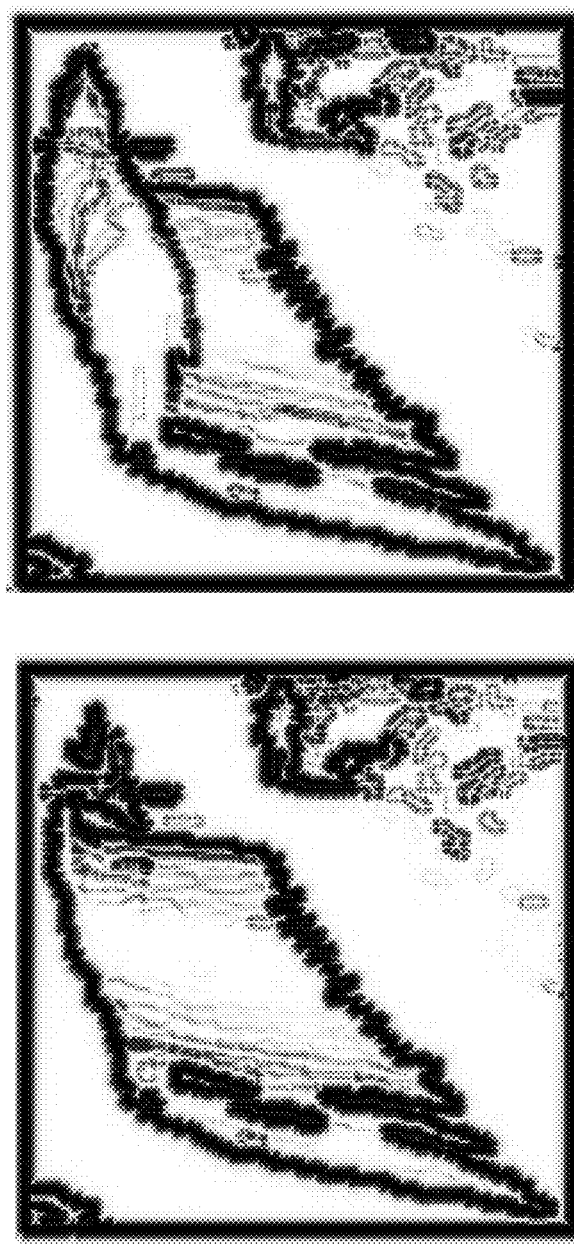
Figure 6 Enlarged views of the difference images accumulated in accordance with different strategies of Figure 1g in the contour representation selected for improving printability of the present specification with clearer and thus more easily detectable gradient lines within the movement range

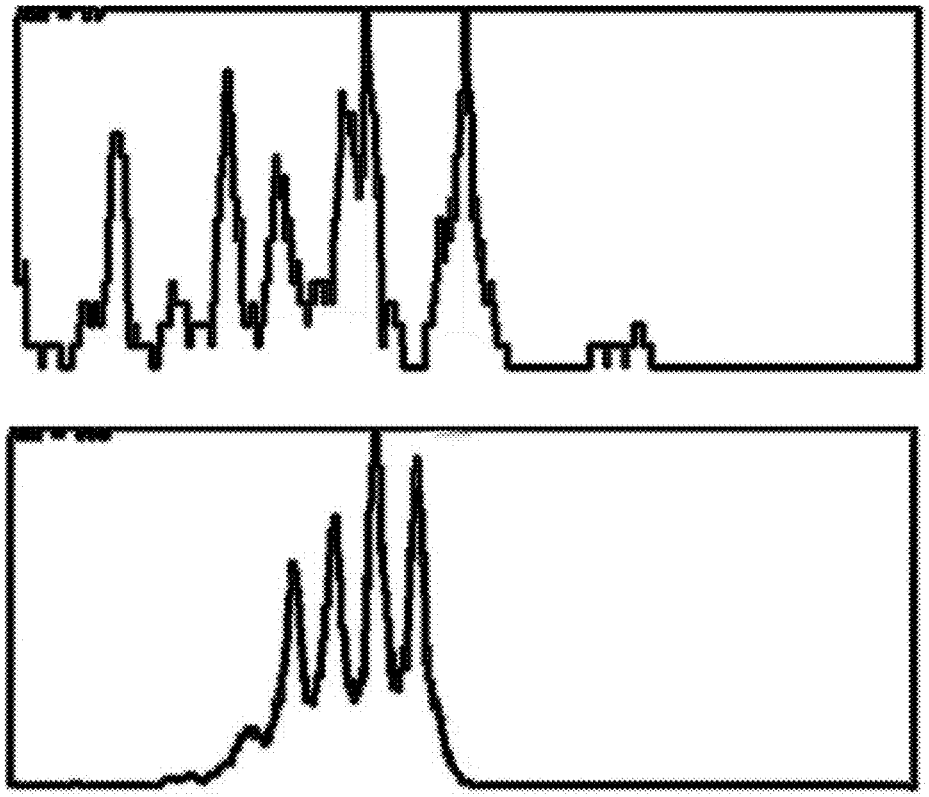

Figure 7 Histograms relating to different movements
    wherein the following is shown:
        the frequency of a pixel distance
            between
                two
            entries having different ages
                in the accumulator field
    namely
    at the top for a car moving approximately along the path along which a pedestrian walked in Figure 3
    and
    at the bottom for a comparatively slow movement of a pedestrian transversely passing the camera (see situation of Figure 3).

VIDEO STREAM EVALUATION

TECHNICAL FIELD

The present invention relates to the subject-matter claimed in the preamble and, therefore, it relates to the evaluation of video streams.

BACKGROUND OF THE INVENTION

Video streams are nowadays often detected for monitoring specific areas. These areas can be, e.g., areas in which there is a risk of theft such as in sales areas in retailing, or outer areas of facilities to be protected such as storage buildings, airports or military facilities. Monitoring is improved if more as well as more efficient cameras are available, so that a relatively high resolution is possible and non-monitored areas can be reduced in size or avoided.

However, it is not sufficient to only direct a camera to areas of interest. Because of the thus generated large data volumes it should rather be possible to differentiate in the video streams between relevant and irrelevant information, i.e. identify activities of interest.

In many cases, for example in perimeter monitoring, it is mainly of interest whether there are movements in an area or not. In such a case, for example, an alarm can be triggered or the storage of data can be initiated. It is pointed out that data storage, alarm triggering, etc. caused by the detection of a movement can also be coupled to the additional occurrence of specific signals of other sensors, detectors or general signaling devices such as heat alarms, smoke alarms or data relating to retailing actions such as "till open" or "price tag of article XY scanned". It is pointed out that this can offer advantages also with the present invention, also advantages being essential to the invention.

Movements of objects lead to image changes that can be determined per se. It is known to carry out extensive analyses in the image in order to recognize "background", define "objects" in front of the background, e.g., by edge detection, and then monitor the movement of the respective objects over several frames, which is done in particularly demanding applications also by updating background changes. While such methods are per se able to recognize the movements of objects, they are complex. This is disadvantageous if recognition should take place directly in the camera, because much computing power is necessary in this case. This means increased hardware requirements and increased energy consumption. Even if recognition should not take place in the camera itself but, e.g., in a central unit, this is disadvantageous because as a rule large data volumes accumulate therein and processing thereof in turn leads to considerable processing requirements.

Therefore, it is desirable to be able to detect movements of objects well. A good detection is achieved, i.a., if movement of those objects which are of particular interest is recognized with at best few false alarms and nevertheless little data processing requirements.

It is the object of the present invention to provide novel subject-matter for industrial applications.

This object is achieved in independent form. Preferred embodiments can be found in the dependent claims.

SUMMARY OF THE INVENTION

It is thus a first basic idea of the invention that in a method for recognizing activities detected in digital video streams, data relating to frame differences are accumulated for frame sequences in fields, gradients are determined in the accumulator fields, and activity is concluded from the gradients. It is pointed out that this method can obviously run automatically, i.e. without human intervention, on a machine, for example in a camera, a computer, etc. Hence, if it is mentioned in the present description and the corresponding claims that, e.g., activity is concluded or, e.g., activities are considered to be "detected", this means that such a conclusion as to the presence of activity is made by a machine and automatically without intervention of the human mind and that evidently also a corresponding reaction can automatically occur or be initiated, for example the in turn automated output of signals, the setting of a flag, the execution of a specific program, etc.

It is also pointed out that the present application often mentions specific assessments, analyses, interpretations, etc. to which a video stream is subjected, and it is obvious from the above that such interpretations and assessments are automatic evaluations by a machine such as a camera, a PC or the like and that they do not refer to a human activity, unless something else is directly and explicitly evident.

According to the invention it is therefore no longer necessary that first objects as such are identified by an involved image analysis such as edge detection in each frame and then the accordingly defined objects are traced from frame to frame. Rather, the new method can be carried out in digital video streams quickly and easily and with low computing requirements and it is at the same time particularly robust against false alarms. In particular, the new method of the invention is much more powerful than a mere difference formation which is also responsive to trembling movements of leaves, etc. and misinterprets them as movement.

It is moreover pointed out that also when it is not explicitly mentioned, the invention refers to digital video streams. The person skilled in the art will understand that the latter are typically recorded by means of digital cameras but that also digitized video streams of analogous cameras can be processed. It is also stressed that the frame rate will typically and advantageously be at least so high that the video streams are sensed by a human observer as smooth but that this is not mandatory.

The evaluation of the present invention can be carried out quickly and with little computing requirements.

Typically, a movement of objects is detected as activity. In response to such an activity, storage of high-resolution images or image areas, for example of (only) those areas in which movement has been detected, and/or transmission of entire images, data-reduced, e.g., compressed images, alarm triggering, etc. can be caused.

It is pointed out that for further reducing system responses caused by activities such as activity notifications and/or storages and/or data transmissions, it can be required that other sensors also detect (specific) activities simultaneously or in a slightly time-delayed manner. For example, a view field can be detected by means of two cameras, if applicable also from two far apart positions, and it can be required that activities are detected with both cameras. It is per se conceivable that the areas for which activities are detected are adjusted for both cameras by calibration processes, etc. Moreover, it can, e.g., be required that a comparatively narrow synchronization of the video streams takes place. However, these two measures are not absolutely necessary for reducing the requirements. Rather, typical signal transmission times will be sufficient for exchanging a signal between multiple cameras, according to which an activity has just been detected by a camera. If the other camera which monitors at least parts of the same area then also detects an activity, this can be sufficient for justifying alarm triggering, data storage, etc. This facilitates installation, evaluation, etc. considerably.

Moreover, there are also other ways of using further data for detecting activity additionally and/or alternatively to one or more further cameras. For example, smoke alarms, temperature sensors, acoustic noise sensors, etc. can also be evaluated simultaneously. Furthermore, for example in connection with monitoring in retailing, a specific activity such as scanning a (specific) article by means of a barcode reader can be used for additionally determining particularly relevant activities. The presence of such an activity can be notified to the camera by transmitting a respective information signal to the camera. Only when multiple conditions arrive simultaneously is it necessary to initiate a suitable system response in a corresponding system. This allows, e.g., a transmission of one or more images of an article moved over a conveyor belt of a cash desk to a data evaluation unit which has access to an image database of articles in order to check whether or not a specific scanned article corresponds to the expected image. It is thus possible to notice incorrect labeling or fraud by tag manipulation. If necessary, there can also be a coupling to recognized weights of articles, so that it can be required as two additional conditions that an article is scanned and the detected weight does not belong to the article before the image parts belonging to the moved areas are transmitted and analyzed.

It is also advantageous if, in a method according to the invention, the movement of objects is detected as activity if indications for movement are detected over a specific minimum number of frames and/or if indications for movement exist over not more than a specific number of frames.

By interpreting frame differences only as movement if corresponding indications are observed in a relatively large number of successive frames, false alarms by atypically fast objects can be avoided. For example, close to a camera a bird can fly very fast through an image field while a human moving at a larger distance from the camera will cross the image field only clearly more slowly. Also short changes caused by lightning, falling over or falling down objects, etc. do not cause false alarms if it is required that a movement should extend over a minimum number of frames for triggering a system response such as an alarm or the like. However, if changes take place very slowly, for example when shadows move, it can also be decided not to trigger an alarm.

In order to detect the particularly relevant activities in case there are activities having different speeds, it is advantageous if, in a method according to the invention, differences are determined for a number of 8 to 128 frames per frame sequence, preferably for about 32 to 64 frames. This number of frames is, on the one hand, as a rule sufficient for reliably detecting movements, i.e. also if the images are affected by sensor noise caused by unfavorable light conditions, camera movements caused by shocks, trembling of leaves in the wind or the like. Here, an increased number of frames increases security against such disturbances. At the same time, the number of frames per sequence is not yet so large that an excess workload has to be dealt with. It is obvious that as the number of frames increases also the workload increases.

It depends on a number of factors how many frames should actually be detected in a given implementation. For example, i.a. the distance and size of the image field must be taken into consideration because when movements take place very close to the camera also a comparatively slow movement will lead to a quick change in images while in connection with movements at a larger distance, also quickly moved objects can be monitored over many frames—as a rule it is desirable that activities, at least by humans or vehicles, cause a system response such as an alarm if they are detected in frequency segment periods of 1.5 to 4 seconds. Moreover, it is also possible to take into consideration the available computing power which can be restricted by the overall processor power, the admissible energy consumption and/or further data processing tasks that have to be executed in addition to the activity recognition. Also the size of the areas in which activities should be detected can play a role. For example, it makes sense to perform an adaptation of these area sizes to the activities to be detected. For example, if articles that are moved over a conveyor belt at the cash desk of a supermarket should be detected by means of a camera which monitors, in addition to the conveyor belt of the cash desk, also further areas, e.g. the queue in front of the cash desk or the packing area, activities in considerably smaller image sections must be identified with the same resolution as compared to the mere monitoring of whether or not a person approaches a cash desk. Moreover, an increased workload might occur if different accumulator fields should be served.

It is advantageous if multiple accumulator fields are provided in accordance with a method of the invention.

Multiple accumulator fields per frame sequence can be used, e.g., in order to evaluate different image parts, e.g., red, yellow and blue image parts. While the typical case of the activity sensor of the invention is implemented by evaluating gray values of the images, it can be advantageous to evaluate instead or additionally specific or all colors. For example, when an alarm is triggered in railway systems in response to a camera monitoring railroad workers moving over the rails, a recognition adjusted to the typical signal color orange is advantageous. The same is true in the cash desk area where, e.g., specific articles (which are known by scanning the barcode printed thereon) should be recognized—in this case, e.g., a preferred color on the basis of which an article can be recognized optimally can be stored in a database. This color can be transmitted to the activity sensor and then an analysis for searching a movement of such an article can be caused. For example, an alarm can be triggered if no movement with respect to the scanned article is detected in the area of the conveyor belt of the cash desk.

It is also possible to use multiple accumulator fields for achieving an adaptation to different movement speeds. For example, in wide-angle monitoring it can be taken into consideration that relatively close and far away areas should be monitored with different resolutions, i.e., in relatively close and far away areas different frame numbers per frame sequence should be taken into consideration, i.e. only not directly successive frames but frames succeeding each other at time intervals should be taken into consideration. Since close to the camera a movement leads to greater and more readily evident changes than an equally fast movement that is monitored very far away, it is possible, e.g., to detect movements close to the camera by using an accumulator field for changes which take place from frame to frame and to detect movements that take place farther away by using an accumulator field which determines a difference image only every, e.g., 4 or 10 frames. Moreover, it can be taken into consideration that farther away movements are as a rule detected on fewer pixels. For being able to detect also these movements well, it is thus possible to select a higher resolution than for the accumulator field by means of which fast, close movements should be detected. However, if a movement should also be recognized at very large distances, it thus makes sense to accumulate at least for this purpose differences with the highest possible resolution. It is evident from the above that, if desired, accumulator strategies can be used in which both the resolution of the accumulator fields and the rate of considered frames differ. If necessary and/or desired, it is also possible that for very far away areas, multiple frames are first averaged and then a difference is formed of the averaged average value frames (which are preferably apart from each other in view of the frames incorporated in the average values) in order to determine the accumulator fields. Forming an average value cannot only help to reduce noise during the night but can also help to clearly reduce, e.g., during the day the influence of air turbulences caused by very hot air, etc.

It is disclosed that it is also possible to pursue different accumulator strategies for each resolution and/or each frame rate.

Alternatively and/or additionally it is possible to use multiple accumulator fields for detecting movements towards the camera and also movements away from the camera. This can be achieved by different accumulator strategies for the different fields.

Moreover, it is pointed out that where different accumulator fields are mentioned in the present case, per se an implementation is possible which writes accumulated information which can per se be distributed to multiple fields in a suitable manner in only one field. For example, a data format is conceivable in which, in a number field, digits to the left of the decimal point indicate an accumulated gray level whereas digits to the right of the decimal point indicate an accumulated color value. It is also possible to start a frame sequence with each newly included frame and then carry out for it an accumulation over the desired number of frames. When considering 40 frames per sequence, there are, e.g., simultaneously 40 accumulators. While such a course of action is possible, it is possible to alternatively select data formats and/or accumulator strategies in such a manner that together with the accumulated value, which is written into the field, also the time point is registered at which it was entered so that particularly old frame differences, which are thus lying outside a frame sequence to be currently considered, can be ignored and/or deleted and/or it can be recognized and if required assessed how old an accumulator entry is. Alternatively to using many accumulators which have to be newly initiated for each frame sequence, it is also possible to select a method in which a high value in the accumulator field can be assigned to a "fresh" difference and this value can be gradually reduced as the value grows older. For example, if 20 frames should be considered for detecting a movement, a value "20" can be written into the field after an initial initialization to the constant value zero at each pixel of the accumulator field if the accumulator strategy defines that the presence of an image difference should be entered there into the accumulator field. Before values are then entered into the accumulator field for the next frame for present image differences, each value in the accumulator field is reduced by one if the value is still greater than zero.

In the accumulator field, values of, e.g., "20" then indicate just yet occurred image differences, values of, e.g., "19" indicate that in the previous frame there was a difference at this pixel as compared to the previous but one frame, etc. In this manner, the values in the accumulator field thus encode the age of the entry or the time that has passed since a specific image change at this pixel. References to 40 or 20 frames and values of 20 are obviously not mandatory. For example, it turned out that already with, e.g., 5 or 6 frames in one sequence, a good movement detection is possible. Moreover, it is not necessary to decrement the entries in the accumulator field in steps of 1. Also steps different from "1" are readily possible.

A further advantage is offered if it is decremented beyond zero, i.e. if the entry of negative values in the accumulator field is allowed. In such a case, for new entries a negative value present at a pixel can be treated as if a value "zero" were standing there. Also in connection with gradient formation, a negative value can be treated like the value "zero". However, it is interesting if the image background should be detected. In this case, a value far below zero is in favor of the fact that nothing has changed at a position for a long time. Thus, the corresponding pixel is very likely a background pixel of a very stable background value. This helps for determining the background. Moreover, it is possible to react in a different manner to movements in those areas in which normally no movement occurs, if necessary. Furthermore, it is possible that only in each x-th frame, e.g, each 10-th, 100-th or 4096-th frame, a negative value is further reduced. Thus, the typically available number range is sufficient for relatively long time periods.

It is pointed out that it can be particularly advantageous to store all frames of a frame sequence which is currently examined for activities at least until it is determined that no activity of interest has been detected in these frames. It is thus possible to store, transmit or use the output frames permanently for a further evaluation when a relevant activity has been recognized. The technically simple realization of such a buffering is possible, e.g., by using ring buffers. It is also pointed out that it might probably be sufficient to determine data related to the frames, e.g., coarse images being reduced to coarse blocks, and to then immediately delete the original frames or store them only in accordance with an, e.g., also completely activity-independent strategy. Instead of buffering the frames or the reduced frames (e.g. coarse-block frames and/or frames being reduced to gray values), it is also possible to buffer only the corresponding difference values. Such difference values are typically determined with respect to the immediately preceding frame, unless something else is dictated by the requirement to recognize very slow movements.

It is particularly advantageous if, in a method according to the invention, data relating to frame differences are accumulated in accordance with different strategies. Thus, different activities can be recognized reliably, e.g., a movement towards the camera and a movement away from the camera. It turned out to be advantageous for recognizing these movements if data are accumulated in accordance with two different strategies. For example, in a first accumulator field a value can always be stored at a given image position if, at this position, for the considered sequence the previous value was zero for all previous differences. An image position is understood to be a pixel or a block determined on the basis of multiple pixels by averaging or the like—i.e. during accumulation it is tested pixel by pixel or block by block how the frames of a sequence differ.

Just in cases in which only difference values being different from zero should be entered in an accumulator field, it can be advantageous if such difference values are only entered if they are sufficiently clearly different from zero. This avoids any negative effects caused by noise, etc. However, it is pointed out that when considering block differences instead of pixel differences, the influence of noise, shaking, etc. is nevertheless smaller and, moreover, a threshold behavior can still be implemented during gradient formation in order to consider only those gradients in which the gradients themselves and/or the gradient-forming values exceed a specific minimum.

The difference values can be determined in different ways. For example, the difference in view of a preceding frame can be determined. In such a case and with the movement remaining the same and the illumination being homogeneous, for all succeeding frames an approximately equal difference value will be obtained along the object path at the edges, which can be readily evaluated.

Alternatively and/or additionally, it is possible to determine the difference image relating to a reference image. For example, a currently recorded frame (which is marked by the temporal reference number i) can be compared with the frame recorded directly previously (i.e. the frame i-1), then with the frame i-2, then with the frame i-3, etc., for example up to frame i-40. It is possible to write the accordingly determined difference values directly into the accumulator field if the respective accumulator writing strategy is met, or a value which at the same time encodes the age of the comparative frame. Thus, whenever a sufficiently large difference value occurs, i.e. a specific threshold is exceeded, a value indicating the age of the comparative frame can be written into the accumulator field instead of a value indicating the difference value itself. In accordance with the above example, when the difference with respect to the frame i-17 exceeds the threshold at a specific position in the image, e.g., the value "17" can be entered into the accumulator field.

For example, it is also possible to determine a reference image for difference formation on the basis of the frames by long-term averaging; this reduces the influence of noise further. Then, the differences of a sequence of frames are accumulated to such a background image. The background image can be "adapted" or changed in manners known per se, in order to account for long-term changes in the background caused by changing sun positions, driving off vehicles, etc.

As a further accumulator strategy, a value can be stored preferably in a different accumulator field at a position, i.e. at a given pixel or pixel block, if at this position the current difference for the considered sequence is larger than the difference already stored at this pixel or pixel block. Thus, a maximum value accumulator is obtained. Here, too, the age of the considered frame can be taken into consideration.

It turns out that both movements towards the camera and movements away from the camera can be detected very well by means of such strategies, namely with a respective different accumulator field. At the same time, the requirements for the accumulation according to the two different strategies are minimal because after determining the difference between a pair of frames at a specific position, only a respective comparison of this position with an entry present at the position in the accumulator field is necessary. In the described preferred example, one time it is tested for equality to zero, in the other case the larger value is determined by comparison.

It is possible and advantageous if, in a method according to the invention, a movement direction is determined, in particular by detecting gradients present in the accumulator field. A gradient in the movement shows per se that the accumulated differences follow a specific pattern, which speaks against an accidental variation. The gradient can be formed, e.g., such that a direction of strongest change is determined. Alternatively, which is easier, in a method according to the invention the gradients can be determined for each accumulator field in two directions, in particular along lines of the accumulator field and along columns of the accumulator field.

For example, a movement can be assumed if a gradient is present in a specific direction for each of the pixels for a relatively large area of output pixels. This will be the case if the position of a relatively large object has changed. The size of the area starting from which an alarm is triggered as system response if a gradient in a specific direction is continuously or mainly present in this area can, as mentioned above, depend on the size of the monitored area for which it is typically expected that an object movement is monitored.

Therefore, it is advantageous if, in a method according to the invention, activity is concluded from the gradients if the gradient value exceeds a specific value and/or if the gradient values exceed a specific value in a sufficiently large, in particular continuous area.

While the presence of a gradient and/or a sufficiently large area with comparable gradient values in the accumulator field per se indicates a movement in the image, the movement itself can even be inferred from the gradient itself. What can be evaluated are, i.a., the size of the area and/or the size of the gradient itself as well as the direction of gradients. For example, in the accumulator strategies that are described as particularly preferable, also an at least coarse movement direction can be detected.

It is pointed out that different accumulator strategies for one and the same movement lead to different gradient patterns. If gradient patterns are evaluated for determining the movement or movement direction, it thus makes sense to also take into account the accumulator strategy.

As mentioned above, it is possible and because of the minimal requirements also particularly advantageous if, in a method according to the invention, frame differences are determined on the basis of the gray levels. Hence, for a given frame, the gray levels are typically used for each position of the considered image. In data-reduced methods in which the images are not used with their full resolution for the activity analysis but in which images and/or image sections with reduced resolution are considered, this can be advantageously realized in that an averaging is performed via the pixels in a block. If the gray value images obtained in this resolution-reduced manner are stored in a buffer, the data processing required for each sequence can be kept at a minimum.

As mentioned above, it is advantageous if, in a method according to the invention, blocks are formed from multiple pixels before difference formation and if the differences of these blocks are determined so that the accumulator fields have a lower resolution than the video stream. For example, a reduction to 320*240 blocks turned out to be sufficient also for gray levels. This is not limiting in view of the resolution required for activity recognition. For example, even with 256*192 blocks, good activity recognition was caused. As a rule, it is advantageous if the resolution provided by the camera can be scaled down easily to the resolution used for difference accumulation. This will typically be the case if it can be scaled with fast algorithms, e.g. if a scaling-down with even integers is possible. It is also pointed out that scaling-down is typically performed prior to difference formation, but that this is not mandatory. Rather, a difference can also be formed in a high-resolution image, and then the difference image can be scaled down. It is also mentioned that in many cases differences relating to the maximum resolution are advantageously considered and accumulated, for example in connection with large-area monitoring tasks with far apart camera units.

Moreover, it is pointed out that data reductions are often made in any case in digital video cameras, for example in order to be able to provide by means of a high-resolution camera a video stream having a spatially low resolution and thus being transmittable in a network with low data load.

Protection is also sought for an apparatus for carrying out the method of the present invention with a difference formation step for forming data characterizing frame differences, at least one accumulator field for storing data characterizing frame differences, a gradient forming means for forming gradients in the accumulator field, and a gradient evaluating means for deciding whether or not a formed gradient refers to or suggests an activity.

Such an apparatus can be, e.g., a digital camera with a suitable software or firmware for carrying out the data processing method. It is pointed out that such cameras can transmit data via LAN/WLAN/WAN/GSM/UMTS or the like using conventional protocols such as TCP/IP or the like.

It is also pointed out that further protection is sought for software by means of which the method according to the invention can be implemented.

DESCRIPTION OF THE DRAWINGS

In the following, the invention will be described exemplarily on the basis of the drawings in which FIG. 1a shows a test frame from a frame sequence in which a person moves away from the camera, FIG. 1b shows a difference image relating to the frame sequence, FIG. 1c shows difference images accumulated in accordance with strategy 1 ("forwards"), FIG. 1d shows difference images accumulated in accordance with strategy 2 ("rearwards"), FIG. 1e shows sections of the difference images forwards/rearwards, FIG. 1f shows contour images relating to FIGS. 1a and 1b with gray value lines, FIG. 1g shows contour images relating to FIG. 1e with gray value lines, FIG. 2a shows a test frame from a frame sequence in which a person enters the scene from the right, moves to the left and then moves away from the camera along the cars (shown in this phase), FIG. 2b shows a difference image from the frame sequence of FIG. 2a, FIG. 2c shows difference images accumulated in accordance with strategy 1 ("forwards"), FIG. 2d shows difference images accumulated in accordance with strategy 2 ("rearwards"), FIG. 2e shows contour images relating to FIGS. 2c and 2d, FIG. 3a shows the movement of a person transversely with respect to the camera, on the left an example frame from the test sequence, on the right a difference image relating to the previous frame, FIG. 3b shows differences accumulated in accordance with different strategies, FIG. 3c shows contour images relating to FIGS. 3a and 3b, namely at the top relating to FIG. 3a, at the bottom relating to FIG. 3b, FIG. 4a shows the movement of a car towards the camera, on the left an example frame from the test sequence, on the right a difference image relating to the previous frame, FIG. 4b shows differences accumulated in accordance with different strategies, FIG. 4c shows contour images relating to FIGS. 4a and 4b, namely at the top relating to FIG. 4a, at the bottom relating to FIG. 4b, FIG. 5 shows enlarged views of the difference images of FIG. 4b accumulated in accordance with different strategies in the contour representation selected for improving printability of the present specification with clearer and thus more easily detectable gradient lines within the movement range, FIG. 6 shows enlarged views of the difference images of FIG. 1g accumulated in accordance with different strategies in the contour representation selected for improving printability of the present specification with clearer and thus more easily detectable gradient lines within the movement range, FIG. 7 shows histograms relating to different movements, wherein the following is shown:
the frequency of a pixel distance between two entries having different ages in the accumulator field,
namely
at the top for a car moving approximately along the path along which a pedestrian walked in FIG. 3
and
at the bottom for a comparatively slow movement of a pedestrian transversely passing the camera (see situation of FIG. 3),
as well as

DETAILED DESCRIPTION

According to the invention, an apparatus for carrying out a method in which data relating to frame differences are accumulated for frame sequences in fields, gradients are determined in the accumulator fields and the activity is inferred from the gradients is provided with a difference formation stage for forming data characterizing frame differences, at least one accumulator field for storing data characterizing frame differences, a gradient forming means for forming gradients in the accumulator field and a gradient evaluating means for deciding whether a formed gradient indicates an activity.

This device can be a per se conventional digital video camera, i.e. a video camera which outputs a video stream as digital data stream and allows digital processing of the video data. In particular, this camera will record a sequence of individual digital images so fast that the human observer who monitors the image sequence during a time interval which is as long as the recording interval is given the impression that there is a fluid or almost fluid motion instead of individual images. This can be achieved with frame rates starting at approx. 24 frames/sec. However, it is pointed out that the present invention can also be used with different frame rates, for example, if the given frame rate is per se smaller This can already be the case when monitoring at faint light, e.g., during the night. In this case, a required exposure time in the range of, e.g., one second per frame might be necessary. It is pointed out that, if applicable, one and the same camera can be operated at one and the same place evaluating different frame rates.

Moreover, it is pointed out that the invention can also work advantageously with low frame rates if, e.g., very far apart areas are monitored in which—with the same resolution—moving objects move only more gradually across an image area because of the smaller representation measure than is the case with close objects. Furthermore, it is also possible to select also a clearly lower frame rate if, e.g., very slow processes should be monitored.

The conventional digital video camera of the present invention will have an internal data processing unit in which image data can be processed and stored. The camera will have at least a processor, data and program storage units as well as at least one interface by means of which the camera can communicate with a central unit, a security service, a data base, a host computer or the like. This can be done by using per se suitable, known or even future communication protocols without the invention being affected thereby.

Such a data processing unit will be programmable by software or firmware for carrying out different data processing tasks. The efficiency will be selected such that the method steps described herein can be easily processed in real time. Since, as is evident to the person skilled in the art, the data processing power required for the method steps required and/or preferred in accordance with the invention is only low, there are no particular demands in view of computing capacity.

Moreover, it is evident that no considerable hardware requirements are necessary for the data and/or ring buffers that are required or advantageous in accordance with the invention for frames of a sequence, for frames being reduced to blocks, for the accumulator fields for different strategies, for the gray and/or color value images or blocks relating to frames of a sequence, etc., but that existing cameras rather typically provide memories so large that the invention can often be readily carried out on such cameras. It is moreover referred to the fact that the method does not necessarily have to be carried out on a camera but that it can also be carried out in a control center or the like, if applicable also on stored data.

It will also be evident from the above statements that, although reference is made to accumulator fields, difference formation stage, gradient evaluating means, etc., it is sufficient for implementing these elements and means to use a conventional data processing structure which is common in digital cameras. Hence, as far as protection is also claimed for an apparatus for carrying out the method according to the invention and comprising, e.g., a difference formation stage for forming data characterizing frame differences, at least one accumulator field for storing data characterizing frame differences, a gradient forming means for forming gradients in the accumulator field and a gradient evaluating means for deciding whether a formed gradient indicates activity, it is obvious that this apparatus per se can be realized as a conventional video camera which, however, is specifically altered by suitable software or firmware for carrying out the data processing method so that the respective elements are realized by the data processing unit.

It is pointed out that cameras of this kind can transmit data via LAN/WLAN/WAN/GSM/UMTS/Bluetooth/USB or the like by using conventional protocols such as TCP/IP or the like. Hence, an exchange of additional signals, e.g., from tills in retailing, data bases, smoke sensors, etc. can be made via such protocols.

On the basis of the above, data detected by the camera are processed in the manner exemplarily described below with reference to the Figures.

The method is first explained with reference to FIG. 1.

FIG. 1a first shows in black and white, i.e. in gray level steps, a test frame of a frame sequence in which a person moving next to the right row of parking cars moves away from the video camera. Such a scene is typical for an application of the invention. It is pointed out that the video camera recording can be colored, i.e. color frame data can be present. In such a case it is preferred to consider only the gray values for a simple implementation so that then an image such as FIG. 1 can be assumed.

The movement of the person within the image area leads to differences between the frames of the sequence. This is shown in FIG. 1b. The areas in which the image changed considerably are bright. Here, the differences relating to a previous frame are shown, i.e.:

First, a difference of the frame pair (i, i-1) is determined.

Then, the difference of the frame pair (i-1, i-2) is determined.

Then, the difference of the frame pair (i-2, i-3) is determined, etc.

It is evident from FIG. 1b that in the upper third of the image, approximately in the center, there is a bright spot which belongs to the moving person and his/her shadow. Moreover, at the front left of the image, there is a bright area which belongs to the shadow of a tree in the foreground of the image. In the background there are moreover bright areas which are associated with further trees and/or the contours of parking cars.

Since it is anticipated that mere bright and dark representations such as photographs are at best difficult to see when reproducing the present specification, there are additional auxiliary representations relating to FIGS. 1a and 1b in which important contours are visible, i.e. in which mainly only edges between relatively bright and relatively dark areas have been determined. It is stressed that such an edge detection and such a representation of edges in the image are not required for the method of the invention but were made only for improving the illustrations in the present patent application, i.e. were made specifically for the present description in order to compensate for the expected deficiencies on publication. This also applies to all further contour representations.

The fact that shadows of trees are visible in the difference image also in case of fast frame rates can be caused, irrespective of the rather slow movement of the sun, just particularly in images taken outside by the wind or by changing clouds in the sky and thus by changing light conditions. The thus caused effects in the image should be differentiated from the image change caused by the moving person.

To this end, the difference images are now accumulated. During accumulation, it is tested pixel per pixel for each difference image whether or not an entry should be made at the position of this pixel in the accumulator field due to the current difference value at the pixel position of the difference image.

This examination can follow different strategies. In the present case, two strategies are used simultaneously.

For both strategies it is assumed that at the beginning of each sequence, the respective accumulator field is set to zero, i.e. each pixel in the accumulator field has the initial value zero. In view of statements made further below, it is already now pointed out that this assumption has merely didactic reasons for being able to explain the invention better.

For the first strategy, a value is written into this accumulator field at a pixel whenever the currently considered difference image is clearly different from zero at this position (i.e. if the difference exceeds a specific threshold—in FIG. 1b it would thus be BRIGHT). In accordance with the first strategy it is not tested whether there is already an entry from a previous difference image at this position in the accumulator field. Hence, possibly old differences are overwritten.

For being able to differentiate in this strategy between new and old entries in the accumulator field, it is numerically encoded for each entry to which difference image it belongs. For example, for the difference of the frame pairs (i, i-1) the value 1 can be entered into the accumulator field, for writing in a difference of the frame pair (i-1, i-2) the value 2, for a difference of the frame pair (i-2, i-3) the value 3, etc. Thus, the accumulator field shows a value which indicates how old a specific entry is.

Another strategy is followed with a further accumulator field. As evident from the various examples, the simultaneous use of multiple different strategies is advantageous in connection with movement patterns not known in advance.

Also in accordance with the presently suggested second strategy, at a pixel a value can at best be written into the accumulator field if the currently considered difference image is clearly different from zero at this position (i.e. if the difference exceeds a specific threshold—in FIG. 1b it would thus be BRIGHT). However, according to the second strategy it is tested whether an entry is already present in the accumulator field at this position. Only if the value is still zero at the observed position in the accumulator field can an entry be made in accordance with the second strategy. In turn, a value encoding the age of the difference pair is entered. Again, for the difference of the frame pairs (i, i-1), the value 1 can thus be entered into the accumulator field, for writing in a difference of the frame pair (i-1, i-2) the value 2, etc. Thus, also the accumulator field of the second strategy shows a value which indicates how old a specific entry is.

Different from the first strategy, however, old entries are not overwritten. This leads to a different accumulation pattern.

As a consequence of a uniform movement in one direction, there is a large difference from image to image at different but nevertheless neighboring positions. This difference occurs at different times—thanks to the entry of the values relating to the age of the difference into the accumulator field, it can then be determined by forming the gradient whether a movement took place over multiple frames. If this is the case, the gradient in the accumulator field will be different from zero in a comparatively large area whose size depends on the size of the object and on the movement distance and the object distance.

Thus, there are different patterns for the two accumulator fields, as evident in FIGS. 1d and 1e. It will be appreciated that different patterns are advantageous for recognizing different movements.

In the present case, FIGS. 1c and 1d show multiple areas after accumulation in which considerable differences have occurred over a relatively large area. Like in the individual difference image that has been exemplarily discussed, these differences should again be assigned to the trees in the background, the shadow area of the tree in the foreground and the contours of the parking cars as well as the moving person.

However, in the accumulator images there is a considerable difference between the areas that are associated with the moving person and the other areas around trees, tree shadows and parking cars, namely to the extent that only the area belonging to the moving person shows a systematic gradient while the other non-black areas, in which differences have thus also been monitored within the sequence, do not show a systematic behavior.

In order to prove the presence of this movement-related and movement-indicative gradient more clearly, FIG. 1e shows sections of the accumulator images in the area of the movement of the person. FIG. 1g shows respective contour images, wherein also the areas of FIG. 1g having different gray levels are separated by contour lines—however, it is stressed once again that these contour images only serve for clarification and explanation.

It is evident that in one of the two accumulator images the gradient lines are clearer. This image is better suitable for the movement detection of a movement away from the camera.

Moreover, it is pointed out that for the purpose of initialization, initial operation, definition of areas of interest, etc. it can make sense to enter colors into the accumulator fields as values, e.g. by showing relatively old entries in blue, middle-aged ones in green, younger ones in yellow, and very young ones in orange or even younger ones in red. Then, a user can easily recognize movements on the basis of the color pattern, which is helpful for the system implementation which can be performed via a graphic user interface or the like. For example, per se uninteresting image areas can be defined and/or particularly suitable strategies for the expected or critical movements can be selected from a plurality of possible accumulator or difference formation strategies.

The above-mentioned two accumulation strategies are not the only possible strategies. However, they can be implemented easily and are well suited for recognizing a plurality of movements. This will be explained as follows.

FIG. 2 shows a person who enters the scene from the right, moves to the left and then moves away from the camera along the cars. On the basis of the previously determined difference images and the accumulator images obtained in accordance with the above strategies, by forming a gradient in the accumulated movement images, a movement as such can again be recognized and even the movement direction can be coarsely deduced from the form of the gradient. Thus, the method of the invention is stable against direction changes of the movement, i.e. it can also be used if the direction of the movement changes during the sequence. FIG. 2e moreover shows that both strategies lead to approximately equally good results in connection with a movement transversely with respect to the camera.

This is also shown in FIG. 3 in which a person moves transversely with respect to the camera, namely comparatively close to the camera. It is striking that although there is no longer a continuous area at least in the body area of the person in view of the fast change, there is one in the body shadow area. It is pointed out that a movement can also be recognized very reliably by determining the gradient over relatively large areas instead of forming the gradient for narrow areas. This can be done, e.g., by ignoring areas in which the accumulated difference value is zero when determining the gradient. In areas in which the accumulated difference value is zero no change has taken place. In connection with very fast movements this is the case if the object has moved between two subsequent frames by more than one object length.

It is pointed out that, if applicable, it is not necessary in connection with gradient formation that exactly the value zero is shown at a pixel for this value being ignored. Rather, it is also possible to ignore entries in the accumulator field if they belong to a clearly older movement than that which is currently considered.

The presence of gaps in the accumulator field and/or the presence of only relatively old entries between younger entries thus refers to very fast movements. This can in turn be utilized for obtaining an at least coarse measure for a movement speed. To this purpose, e.g., the gap width of zero entries in the accumulator field can be determined, and based thereon a measure for the movement speed can be determined, namely, if applicable, in a manner standardized to the distance from the camera, etc. An even better way of measuring the speed is discussed below.

FIG. 4 shows that also in case of a relatively fast movement, here the movement of a driving car, reliable movement recognition is possible by difference image determination, subsequent difference image accumulation and gradient formation in the accumulator field or image. The clarity of the gradient lines is evident from the view of FIG. 5, which is attached for the sake of disclosure, for one of the two accumulator strategies.

While above the activity sensor according to the invention, i.e. the activity recognition according to the invention has been described mainly with reference to movements, this is not mandatory. For example, it is also possible that a sensor response, i.e. a system response is only triggered if at the same time a specific change in the image is detected, e.g. movement in the direction contrary to a desired direction, movement of multiple objects towards each other, or if simultaneously a further signal, also from another sensor is obtained. In such a case, thus not simply each movement is identified as activity inducing a system response.

Moreover, it is pointed out that not only an alarm can be triggered as system response. For example, in suitable systems a system response can also be the switching-on of (electrical) consumers such as light or controllers of heaters, database inquiries can be caused, e.g., after an object moving towards the service counter in a service counter area has been recognized as customer, for recognizing the customer, etc. For example, here it is advantageous that a biometric evaluation of image data should take place only for those areas which have changed, i.e. in which movement took place. This reduces computing time. Moreover, e.g., in car parks the license plate of entering and exiting cars can be identified following a movement recognition and signals relating to the recognized number can be output. In general, by means of the invention it is thus possible to check and/or more easily carry out a transaction, in particular if the invention is used with databases relating to possible image contents.

Above it has been mentioned for didactic reasons that a distinct accumulator field is used for each sequence. This is not necessary. Rather, it is often sufficient to use for all sequences one and the same accumulator field for one and the same strategy. This is even preferred. For example, the accumulator field can be initialized at the beginning, e.g., set to zero. When data are then entered into the accumulator field, high values can be entered at the respective pixel to be characterized. Before considering the difference for a new frame, all positive values in the accumulator field are then reduced by one. Thus, the data in the accumulator field are aged, so that after a specific number of newly considered frames, again the value zero is shown at a pixel position at which no changes have occurred for a long time. Thus, two accumulator fields are per se sufficient for two accumulator strategies.

In such a case, in the accumulator field, e.g., values of "40" refer to image differences that have just occurred, values of "39" indicate that in the previous frame there was a difference at this pixel as compared to the previous but one frame, etc. Thus, in this manner the values in the accumulator field encode the age of the entry or the time that has passed since a specific image change at this pixel.

When then the gradients are formed, areas which have to be assigned to obviously older movements can be ignored for gradient formation. This also facilitates evaluation in cases in which the movement of many objects must be expected in areas or temporarily, e.g. in station platforms, etc.

As pointed out, it is also possible to estimate the speed on the basis of the "gaps" of the accumulated differences. However, advantageously not the accumulator field itself is considered but the frequency at which specific values in the accumulator field have a specific distance from each other. To this end, preferably corresponding accumulator field histograms are considered which detect such distances of different values in the accumulator field.

A much better way than relying only on the gap width of zero entries in connection with the speed determination is entering the age of the entry into the accumulator field (i.e. recording when a difference vis-à-vis the previous image has occurred at a specific image pixel) and then testing the (pixel) distances of entries of different ages in the accumulator field, preferably by means of statistical methods.

If there is a distance of many pixels between positions at which the age of an entry changes, the object has moved a large distance between the considered frames during this time. It is thus fast. It is pointed out that, e.g., the distances between relevant image areas and the camera etc. can also be taken into consideration in order to obtain more precise information. Calibration can be carried out, if required, or the three-dimensionality of a scene can be taken into consideration in another way. This is easily possible on site mainly in case of immovably mounted cameras. Moreover, a parallel analysis can be made with different image rates and/or resolutions and/or color/gray value channels in order to reduce artifact influences.

Pixel distances of entries having different ages can be examined in different ways. Particularly reasonable are statistical considerations such as the determination of the most frequent distances between entries having different ages. For this purpose, e.g., histograms (determining the frequency of values) can be used, which evaluate an accumulator field line by line or column by column. This can be done by using different strategies.

It is possible to separately make first histograms for lines and second histograms for columns. When determining histograms, overall speeds can be determined in two directions such as columns and lines, e.g., in accordance with a vector addition. The histogram can be determined image area per image area so as to consider perspective influences for recalculating pixel distances into distances or pixel distances per frame distance into speeds. Values determined area by area can be evaluated together after perspective standardization. It is also possible to turn images after a rough estimation of a main movement direction and to make histograms by means of which the distances along such main movement directions are detected.

It is possible to detect in the histogram only how far a pixel, which detects for the current frame (e.g. frame 40) the occurrence of a difference with respect to its previous frame, is away from a pixel by means of which in the previous frame (i.e. frame 39) a difference with respect to its precursor (38) was detected. Thus, it is examined how far positions at which there have been changes in the image have moved apart from each other between two frames. If, as described, only the distances between the current and the directly preceding frame (40→39) are considered in the histogram, a current, instantaneous speed is obtained. It is pointed out that such distances can be determined in the direction of a column and/or a line of the accumulator field. In a uniformly moved rigid body, which is recorded with high resolution and strong contrast with respect to the background, a peak is thus obtained at exactly one position in the histogram.

The peak can, e.g., be broadened in that the moving object is not rigid such as, e.g., a pedestrian who is swinging with his/her arms, so that the latter move partly slightly faster and partly slightly slower than the remaining body. Thus, in the histogram it can be searched for the maximum or for the center of gravity of a peak.

However, other strategies make sense. For example, it can be taken into consideration that not at each pixel at which an object moves in front of a background differences are shown in the image. For example, if only gray values are considered and a pixel value of the object accidentally has the same gray value as the background in front of which the object is moving, a difference cannot be detected. In such a situation, a difference can rather only be noticed when a change took place at this pixel, e.g., by more or less extensive patterns on the object, which requires a further movement of the object. For considering such a situation, it should not only be detected how far the distance between a value 40 and a value 39 is in the accumulator field, because in the described situation such a difference would not occur. Rather, it should be detected how large the distance from an entry with the value 38 is, if on the path to this value 38 the value 39 is not found. Similarly, a distance between entries with the value 40 and the value 37 can be taken into consideration if none of the pixels between these values has the value 38 or 39. However, in accordance with this strategy, averaging already takes place because not only the values of the "instantaneous" speed between the frames 39 and 40 are determined but also older value pairs and thus older speeds are detected.

Even if illumination does not remain the same, e.g. because clouds are moving in the sky, a corresponding course of action is advantageous. Here, real differences might be hidden and apparent differences might be simulated.

It is also possible to determine by means of a histogram an even further averaging average speed by selecting a different histogram strategy. For example, it is possible to detect to which extent a change moves within one frame, within two frames, within three frames, etc. To this end, e.g., the distance between the values 40→39, 40→38, 40→37 can be considered (wherein it should be taken into consideration that, e.g., the distance 40→38 has been passed during two frames). In this strategy, the distance 40→38 is—different from the previously discussed strategy—determined even if the value "39" was found on the path between the pixels.

At a constant speed, the distance 40→38 is twice as large as the distance 40→39, the distance 40→37 is three times as large as the distance 40→39. Thus, equally spaced maxima are obtained in the histogram, and from the position thereof the speed can be concluded.

Alternatively, it is possible to additionally enter into such a histogram how the distances relating to frame pairs 39→38, 39→37, 39→36, etc. look like. This also contributes to an averaging of the speed. In case of slowly moving objects, which are often detected on the successive frames of a sequence, thus particularly distinct, clearly visible maxima are obtained. A corresponding histogram is shown in the lower part of FIG. 7 for a pedestrian who is detected more often during the frame sequence because of his/her comparatively slow movement. The pedestrian moves along the same path as in FIG. 3. However, more, clearly visible maxima can be identified.

In contrast thereto, the top of FIG. 7 shows a histogram relating to an accumulator field obtained during the movement of a car along the path that has been passed in FIG. 3 by a pedestrian. More exactly, also this histogram shows the distances that should be assigned to frame pairs i,i-1; i,i-2; i,i-3; i-1,i-2; i-1,i-3; i-1,i-4; i-2,i-3, etc., and also here some maxima are visible whose evaluation refers to the speed, as evident from the explanation. Because of the higher movement speed, however, the car was detected in less frames of the otherwise equally long sequence, so that the peaks are shown less clearly distinctly.

If an absolutely uniform, easily detectable movement of a rigid body is assumed, it always passes the same difference between two frames. In accordance with some of the strategies described above, multiple maxima will be present in the histogram which, in the ideal case of a rigid body having a good contrast against the background and being constantly illuminated, will have the same distance from each other in case of a uniform movement but which can in practice be broadened and slightly shifted. For evaluating the data easily in case multiple maxima are present, e.g., a Fourier transformation of the histogram can be carried out, e.g. as FFT, and the maximum of the Fourier transformation can be used for determining the speed.

There are further possibilities of obtaining important information by considering histograms, e.g., when considering only pairs 40→39, 39→38, 38→37, etc. The distances detected with respect to these pairs will be uniform if the movement causing image differences is uniform. However, the distances obtained with respect to these pairs change considerably if the speed of the considered movement has changed considerably. Hence, it is thus possible to determine, e.g., how far the corresponding maxima are apart from each other in the respective histograms, how the maximum position develops temporally, etc. This can be used for indicating to or warning against a person starting to run, a car starting to move, etc. This can make particular sense if further information is evaluated, such as the detection of a starting car at a time point at which a traffic light is RED or the running in specific, closed zones, i.e. the detection of movement in the image areas assigned to these closed zones.

Moreover, it is possible to derive a movement direction, namely by considering not only the value of the distance which the values ("39,40") of a value pair (40→39) show, but also by detecting, e.g., by means of an algebraic sign, whether the pixel having the value "39" is on the left or on the right (or at the top/bottom or at the front/rear) of the pixel having the value "40". If a to-and-fro-movement is related to an atypical, possibly danger-inducing behavior, a corresponding analysis can warn thereof. To this end, it is possible to examine whether the histogram maximum of the pair (40,39) lies at a distance having another algebraic sign than the distance of the pair (39,38) or an earlier pair such as (14,13). In the case of slow "pendulum" movements, such a reversal of the algebraic sign might be accompanied by a speed changing during the to-and-fro movement and/or by rest phases with speeds of zero or close to zero. It is obvious that this is shown by the accumulator fields and/or the assigned values.

It is pointed out that an exact speed determination is not mandatory. For example, it might be sufficient to be able to make a rough differentiation in, e.g., three steps: "very fast", "normal movement speed" and "much slower than usual" and/or to generate assumptions as to the moving object ("car", "bicycle", "pedestrian") on the basis of the speed. If applicable, also other image-related data can be evaluated for this purpose, for example the size of an image surface area (corrected in view of perspective), its aspect ratio, the movement direction, topographic characteristics such as the presence of walkways, bikeways, streets in the relevant image area, etc. If necessary, it is also possible to make an edge analysis in a restricted image area for determining the object which has moved. It is not necessary to extend the edge analysis to the entire starting image, but it can be restricted to areas in which a directed movement, in particular a movement with roughly determined speed took place. This reduces the edge detection requirements considerably. It is evident from the above that the presently disclosed consideration and evaluation of suitably accumulated difference fields and the gradients, values and/or value changes are helpful for reducing the image evaluation requirements considerably. Thus, it is believed that the identification of areas which need to be analyzed further because gradients occur in accumulated difference images and/or speed-related data show this is of importance in a manner inventive on its own and claimable in a unique, independent manner in particular for the purpose of image analysis and content analysis. Moreover, with the above it is possible to determine image areas for transmission and/or storage for monitoring and security purposes.

It is evident from the above that the presently disclosed consideration and evaluation of suitably accumulated difference fields and the gradients, values and/or value changes, and/or assigned histograms are helpful for reducing the image evaluation requirements considerably.

Moreover, it is pointed out that temporally equidistant frames have been assumed above for the purpose of the present description, in particular for determining or evaluating movement speeds. In situations in which a temporal frame equidistance cannot be guaranteed, e.g. because the new recording of a frame is somewhat delayed because the camera hardware is used to capacity, the actual frame distance can be taken into consideration. For example, time stamps can be used for this purpose. In cases in which changing and thus partly considerably elongated exposure times per frame must or should be used, e.g. in case of night recordings, this can also offer advantages. For this purpose, preferably time stamps can be used which allow the detection of the time interval of each frame pair, so that the time intervals of the frame pairs can be determined and taken into consideration. The consideration of the time intervals of the frame pairs can also make sense if, e.g., a non-uniformly recorded frame stream should be analyzed subsequently. The exact consideration of the frame recording time makes always sense when considerable effects on the speed determination and/or speed evaluation must be feared. It will be obvious that the consideration of the frame recording time makes particular sense if the detected scene has been calibrated and high accuracies are desired.

What is claimed is:

1. A method for automatically detecting activities captured in video streams, wherein for sequences of frames, frames are paired and data relating to differences between the frames of the pairs are automatically accumulated in an accumulator field having lines and columns, using at least one accumulator strategy wherein the data relating to the differences of the pairs of frames encode the age of entries into an accumulator pixel, automatically determining gradients in the accumulator field and deducing from the gradients that an activity has occurred by determining gradients along the lines and/or columns of the accumulator field and determining that an activity has occurred if a gradient in one direction is observed either continuously or prevalently in an area.

2. The method according to claim 1, wherein data relating to the differences of pairs of frames are automatically accumulated in accumulator fields following at least two different strategies.

3. The method according to claim 1, wherein a plurality of accumulator fields is provided per frame sequence.

4. The method according claim 1, wherein data relating to the differences of frame pairs are accumulated in respective pixels of the accumulator fields such that in the respective pixel of the accumulator field the age of an entry is numerically encoded and such that an entry is independent from whether or not for the frame sequence considered, an entry at the specific pixel of the accumulator field is present already, and/or by writing data relating to the differences of frame pairs are accumulated in respective pixels of the accumulator fields such that in the respective pixel of the accumulator field the age of an entry is numerically encoded and such that an entry is written into the accumulator field only in case that in the respective accumulator field pixel no entry has previously been entered, and/or by writing of data relating to the differences of the frame pairs into a respective pixel of the accumulator field only in case the current difference in this pixel is larger than the difference previously stored for this pixel for the sequence considered.

5. The method according to claim 1, wherein the activity detected is a movement of objects.

6. The method according to claim 5, wherein the movement of objects is detected as activity if the movement is detected for at least a minimum number of frames and if the movement will not last longer than a given number of frames.

7. The method according to claim 1, wherein the differences are determined for a number of 8 to 128 frames.

8. The method according to claim 1, wherein the differences are determined for a number of 32 to 64 frames.

9. The method according to claim 1, wherein the differences are determined for sequences having a duration of 1.5 to 4 seconds.

10. The method according to claim 1, wherein frame differences are determined from the gray values.

11. The method according to claim 1, wherein prior to determining differences, blocks are formed from multiple pixels, and then differences of these blocks are determined, so that the accumulator field has a lower resolution than the video stream.

12. The method according to claim 1, wherein a speed and/or acceleration is determined on the basis of entries in the accumulator field and/or by recourse to Fourier transformations of statistical data, by Fourier Transformation of histograms.

13. The method according to claim 1, wherein a gradient in one direction is determined to be present within an area in a continuous or prevailing manner even if within this area, accumulator field pixels exist having entries that are zero or belong to a movement significantly older than the movement currently considered.

14. The method according to claim 1, wherein a speed and/or acceleration is determined on the basis of entries in the accumulator field.

15. The method according to claim 1, wherein a speed and/or acceleration is determined by recourse to Fourier transformations of statistical data.

16. The method according to claim 1, wherein a speed and/or acceleration is determined by Fourier Transformation of histograms.

17. The method according to claim 1, characterized in that the gradients are determined for each accumulator field in two directions along lines of the accumulator field and orthogonally along columns of the accumulator field.

18. The method according to claim 1, characterized in that activity is concluded from the gradients if the gradient value exceeds a specific value and/or if the gradient values exceed a specific value in a continuous area.

19. A device for executing an activity detection method according to claim 1, comprising a stage for determining data characteristic of frame differences, at least one accumulator field for storing said data characteristic for frame differences, gradient determination means for determining gradients in the accumulator field and a gradient evaluation means for judging whether a gradient determined is indicative of an activity.

* * * * *